United States Patent
Schwerman

(10) Patent No.: US 9,588,528 B2
(45) Date of Patent: Mar. 7, 2017

(54) INRUSH CURRENT SUPPRESSION CIRCUIT AND METHOD FOR CONTROLLING WHEN A LOAD MAY BE FULLY ENERGIZED

(71) Applicant: HONEYWELL INTERNATIONAL INC., Morristown, NJ (US)

(72) Inventor: Paul Schwerman, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/557,113

(22) Filed: Dec. 1, 2014

(65) Prior Publication Data

US 2016/0154414 A1 Jun. 2, 2016

(51) Int. Cl.
| | |
|---|---|
| G05F 1/56 | (2006.01) |
| G05F 1/46 | (2006.01) |
| H02H 9/02 | (2006.01) |
| G05F 1/565 | (2006.01) |
| H02H 9/00 | (2006.01) |

(52) U.S. Cl.
CPC .............. *G05F 1/46* (2013.01); *G05F 1/56* (2013.01); *G05F 1/565* (2013.01); *H02H 9/001* (2013.01); *H02H 9/02* (2013.01)

(58) Field of Classification Search
CPC ........................................................ G05F 1/56
USPC .......................................... 323/281, 282, 283
See application file for complete search history.

(56) References Cited

U.S. PATENT DOCUMENTS

| | | | | |
|---|---|---|---|---|
| 4,641,132 | A | * | 2/1987 | Reger .................... G08B 21/00 340/540 |
| 4,814,687 | A | | 3/1989 | Walker |
| 5,343,383 | A | * | 8/1994 | Shinada ............ H02M 3/33592 363/127 |
| 6,335,654 | B1 | | 1/2002 | Cole |
| 6,735,064 | B2 | | 5/2004 | Miyazaki |
| 6,831,447 | B1 | | 12/2004 | Wittenberg |
| 7,355,368 | B2 | | 4/2008 | Salato et al. |
| 7,449,870 | B2 | | 11/2008 | Cebry |
| 7,557,548 | B2 | | 7/2009 | Fey |
| 8,242,760 | B2 | | 8/2012 | Takagi et al. |
| 8,416,004 | B2 | | 4/2013 | Akizawa et al. |
| 8,624,569 | B2 | | 1/2014 | Heng |
| 8,670,251 | B2 | | 3/2014 | Lu et al. |
| 8,711,587 | B2 | | 4/2014 | Momose et al. |
| 2002/0070687 | A1 | * | 6/2002 | Urakabe ............ H05B 41/2883 315/291 |

(Continued)

*Primary Examiner* — Matthew Nguyen
*Assistant Examiner* — Trinh Dang
(74) *Attorney, Agent, or Firm* — Lorenz & Kopf, LLP

(57) ABSTRACT

A circuit and method for controlling when a load may be fully energized includes directing electrical current through a current limiting resistor that has a first terminal connected to a source terminal of a field effect transistor (FET), and a second terminal connected to a drain terminal of the FET. The gate voltage magnitude on a gate terminal of the FET is varied, whereby current flow through the FET is increased while current flow through the current limiting resistor is simultaneously decreased. A determination is made as to when the gate voltage magnitude on the gate terminal is equal to or exceeds a predetermined reference voltage magnitude, and the load is enabled to be fully energized when the gate voltage magnitude is equal to or exceeds the predetermined reference voltage magnitude.

13 Claims, 3 Drawing Sheets

(56) References Cited

U.S. PATENT DOCUMENTS

| | | | | |
|---|---|---|---|---|
| 2009/0322295 A1* | 12/2009 | Scoones | ............... | G05F 1/56 |
| | | | | 323/282 |
| 2010/0225294 A1 | 9/2010 | Herr et al. | | |
| 2011/0080207 A1* | 4/2011 | Ball | ............... | H01L 23/34 |
| | | | | 327/512 |
| 2014/0049238 A1* | 2/2014 | Hu | ............... | G01R 19/00 |
| | | | | 323/282 |
| 2014/0104889 A1* | 4/2014 | Yamada | ............... | H02M 3/335 |
| | | | | 363/16 |
| 2015/0263619 A1* | 9/2015 | Lee | ............... | H02M 3/1588 |
| | | | | 323/271 |
| 2015/0338866 A1* | 11/2015 | Hu | ............... | H02M 3/157 |
| | | | | 323/280 |
| 2015/0366010 A1* | 12/2015 | Mao | ............... | H05B 33/0815 |
| | | | | 315/223 |

\* cited by examiner

INRUSH CURRENT SUPPRESSION CIRCUIT AND METHOD FOR CONTROLLING WHEN A LOAD MAY BE FULLY ENERGIZED

STATEMENT REGARDING FEDERALLY SPONSORED RESEARCH OR DEVELOPMENT

This invention was made with Government support under NNJ06TA25C NASA Johnson Space Center. The Government has certain rights in this invention.

TECHNICAL FIELD

The present invention generally relates to inrush current suppression, and more particularly relates to an inrush current suppression circuit and method for controlling when a load may be fully energized.

BACKGROUND

The electrical characteristics of some loads are such that, when these loads are connected to an electrical power source, the loads may initially draw relatively large electrical currents. This relatively large initial electrical current draw is generally referred to as inrush current. If the inrush current is excessive, circuit elements can be damaged. Thus, for loads that draw relatively large inrush current, an inrush current suppression circuit may be placed between the electrical power source and the load. An inrush current suppression circuit, as its name implies, suppresses the inrush current for a relatively short time, after which the load is enabled to be fully energized.

In some implementations, enablement of the load to be fully energized is based on one or more timers. That is, full enablement of the load is delayed until the one or more timers time-out. While this technique, as well as various others, is generally effective, it can exhibit certain drawbacks in relatively high-precision circuits and systems. This is because the tolerance stack-ups of the timers and various other circuit components can lead to enablement of the load before inrush current limiting is complete, which can in turn lead to faults and component damage. Moreover, sensing voltage across the inrush current suppression circuit can be inadequate because the load is disabled during the inrush limiting cycle. The load being disabled, plus the addition of power line noise, leads to a low voltage drop, which can result in false enabling of the load.

Hence, there is a need for a circuit and method that limits inrush current for a sufficient period of time before full-enablement of a load, and which does not exhibit undesirable component stack-ups. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an inrush current suppression circuit includes input circuitry, output circuitry, a current limiter circuit, and a load enable circuit. The input circuitry is configured to receive an input voltage from a voltage source and is configured, upon receipt thereof, to supply a gate voltage. The output circuitry is configured to supply an output voltage to a load. The current limiter circuit is coupled between the input circuitry and the output circuitry, and includes a field effect transistor (FET) that comprises a gate terminal coupled to receive the gate voltage. The current limiter circuit is configured, based on the gate voltage, to vary current flow from the output circuitry to the load. The load enable circuit is coupled to the gate terminal and is configured to sense the gate voltage and supply a load enable signal when the gate voltage is equal to or exceeds a predetermined voltage magnitude.

In another embodiment, a method of controlling when a load may be fully energized includes directing electrical current through a current limiting resistor that has a first terminal connected to a source terminal of a field effect transistor (FET), and a second terminal connected to a drain terminal of the FET. The gate voltage magnitude on a gate terminal of the FET is varied, whereby current flow through the FET is increased while current flow through the current limiting resistor is simultaneously decreased. A determination is made as to when the gate voltage magnitude on the gate terminal is equal to or exceeds a predetermined reference voltage magnitude, and the load is enabled to be fully energized when the gate voltage magnitude is equal to or exceeds the predetermined reference voltage magnitude.

Furthermore, other desirable features and characteristics of the inrush current suppression circuit and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
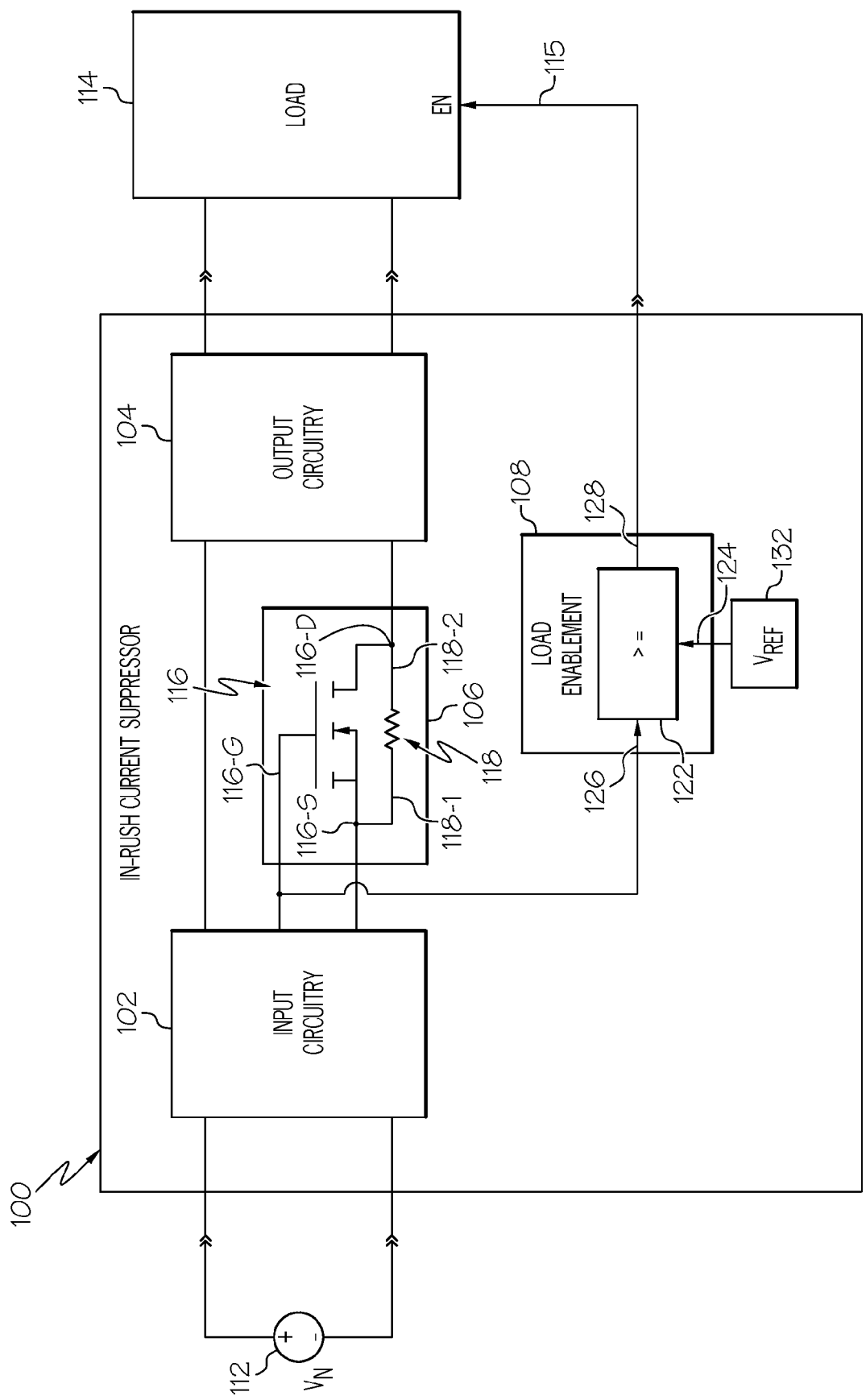
FIG. 1 depicts a simplified functional block diagram of one embodiment of an inrush current suppression circuit coupled to a load.

Referring first to FIG. 1, a simplified functional block diagram of one embodiment of an inrush current suppression circuit 100 is depicted, and includes input circuitry 102, output circuitry 104, a current limiter circuit 106, and a load enable circuit 108. As FIG. 1 further depicts, the inrush current suppression circuit 100 may be coupled to an electrical power source 112 and a load 114. The electrical power source 112 and the load 114 may each be variously implemented, and may be DC or AC, as needed or desired. Regardless of whether the load 114 is an AC or DC load, it is configured to be responsive to an enable signal to be fully energized. That is, the load 114 will not be fully energized by the electrical power source 112 (via the inrush current suppression circuit 100) until the load 114 receives a suitable enable signal 115.

Figure 2:
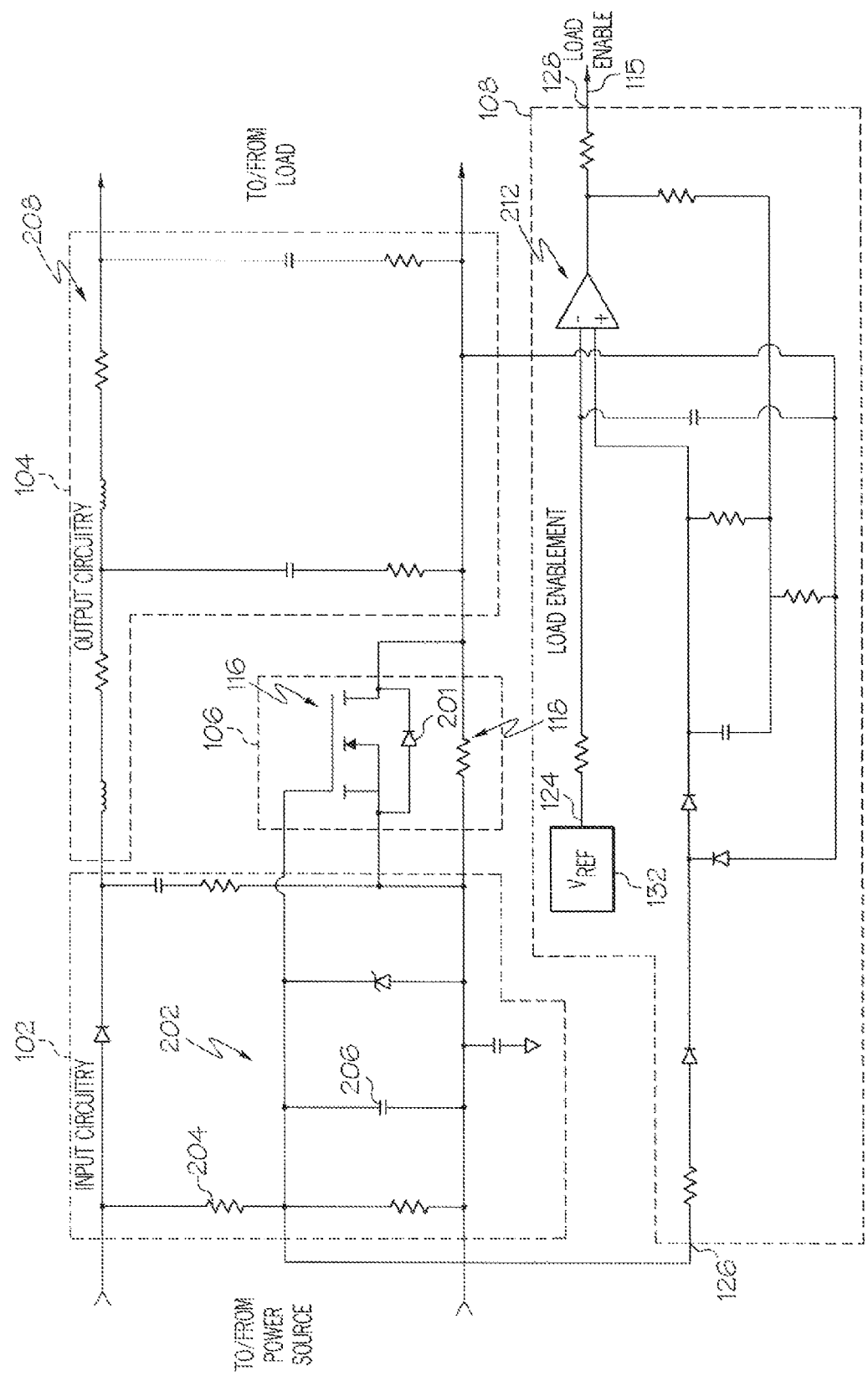
FIG. 2 depicts a detailed schematic representation of one embodiment of the inrush current suppression circuit of FIG. 1.

Returning to the inrush current suppression circuit 100, the input circuitry 102 is coupled to receive an input voltage from the electrical power source 112 and is configured, upon receipt thereof, to selectively energize the output circuitry 104 and to supply a gate voltage to the current limiter circuit 106. It will be appreciated that the input circuitry 102 may be variously implemented, but in one particular embodiment, which is depicted in FIG. 2, it includes at least a series resistor-capacitor (RC) circuit 202. As is generally known, when this type of circuit 202 is initially energized, the voltage at the node between the resistor 204 and capacitor 206 rises exponentially at a time constant established by the values of the resistor 204 and capacitor 206. The depicted input circuitry 102 includes additional circuit elements, the descriptions of which are not needed to fully describe or enable the claimed invention.

The output circuitry 104 is coupled to the input circuitry 104 and the current limiter circuit 106 and is configured to supply an output voltage to the load 114. The output circuitry 104 may be variously implemented, but in one particular embodiment, which is depicted in FIG. 2, it is implemented as a filter circuit 208. Most preferably, as depicted, it is implemented as a low-pass filter 208.

The current limiter circuit 106 is coupled between the input circuitry 102 and the output circuitry 106 and is configured to vary current flow from the output circuitry 104 to the load 114. As clearly depicted in both FIGS. 1 and 2, the current limiter circuit includes a field effect transistor (FET) 116 and a resistance 118. The FET 116, as is generally known, includes a source terminal 116-S, a drain terminal 116-D and a gate terminal 116-G. The source terminal 116-S is connected to a first terminal 118-1 of the resistance 118, the drain terminal 116-D is connected to a second terminal 118-1 of the resistance 118, and the gate terminal 116-G is coupled to receive the gate voltage from the input circuitry 102. Thus, as may be appreciated, the current limiter circuit 106 varies the current flow from the output circuitry 104 to the load 114 based on the gate voltage. Although the FET 116 may be variously implemented, in the depicted embodiment it is a metal-oxide semiconductor FET (MOSFET). As illustrated more clearly in FIG. 2, FET 116 may also include a body diode 201, which rejects line noise that may lead to false determinations that the voltage at the gate terminal 116-G is at a predetermined magnitude.

Before proceeding further, it is noted that current limiter circuit 116 may be implemented without the resistance 118. However, when the resistance 118 is included, it may be implemented using a non-linear resistance. For example, the resistance 118 may be implemented using one or more negative temperature coefficient (NTC) resistors. Such resistors decrease in resistance as temperature increases. As may be appreciated, when the FET 116 conducts, the resistance 118 is shorted out, allowing the resistance to cool and increase in resistance, thereby presenting a high impedance to support inrush current in the event of a power interrupt.

The load enable circuit 108 is coupled to the gate terminal 116-G of the FET 116 and is configured to sense the gate voltage. The load enable circuit 106 is further configured to selectively supply the load enable signal 115 to the load 114. In particular, the load enable circuit 108 will supply the load enable signal when the gate voltage is equal to or exceeds a predetermined voltage magnitude. It will be appreciated that the load enable circuit 108 may be variously implemented, but in the embodiment depicted in FIGS. 1 and 2, it is implemented as a comparator circuit 122. The comparator circuit 122 includes a first input terminal 124, a second input terminal 126, and an output terminal 128. The first input terminal 124 is coupled to a reference voltage 132 that has a reference voltage magnitude, the second input terminal 126 is coupled to receive the gate voltage, and the output terminal 128 is coupled to the load 114. In one particular embodiment, which is depicted in FIG. 2, the comparator circuit 202 is implemented as an op-amp comparator circuit 212 with suitable input, output, feedback, and protection components, and that is configured to exhibit hysteresis.

With the circuit 100 described above and depicted in FIGS. 1 and 2, when the inrush current suppression circuit 100 is initially energized, the gate voltage magnitude on the gate terminal 116-G of the FET 116 varies based on the RC time constant of the series RC circuit 202. Initially current flow to the load is limited by the current limiting resistor 118, but as the gate voltage varies, the effective resistance of the FET decreases 116. As a result, current flow through the FET 116 increases while the current flow through the current limiting resistor 118 simultaneously decreases. At the same time, the increasing gate voltage magnitude on the gate terminal 116-G is being compared to the reference voltage magnitude to determine if the FET 116 is adequately enhanced. When the gate voltage magnitude is equal to or exceeds the predetermined reference voltage magnitude, the load enable circuit 108 supplies the enable signal 115 and enables the load 114 to be fully energized.

Figure 3:
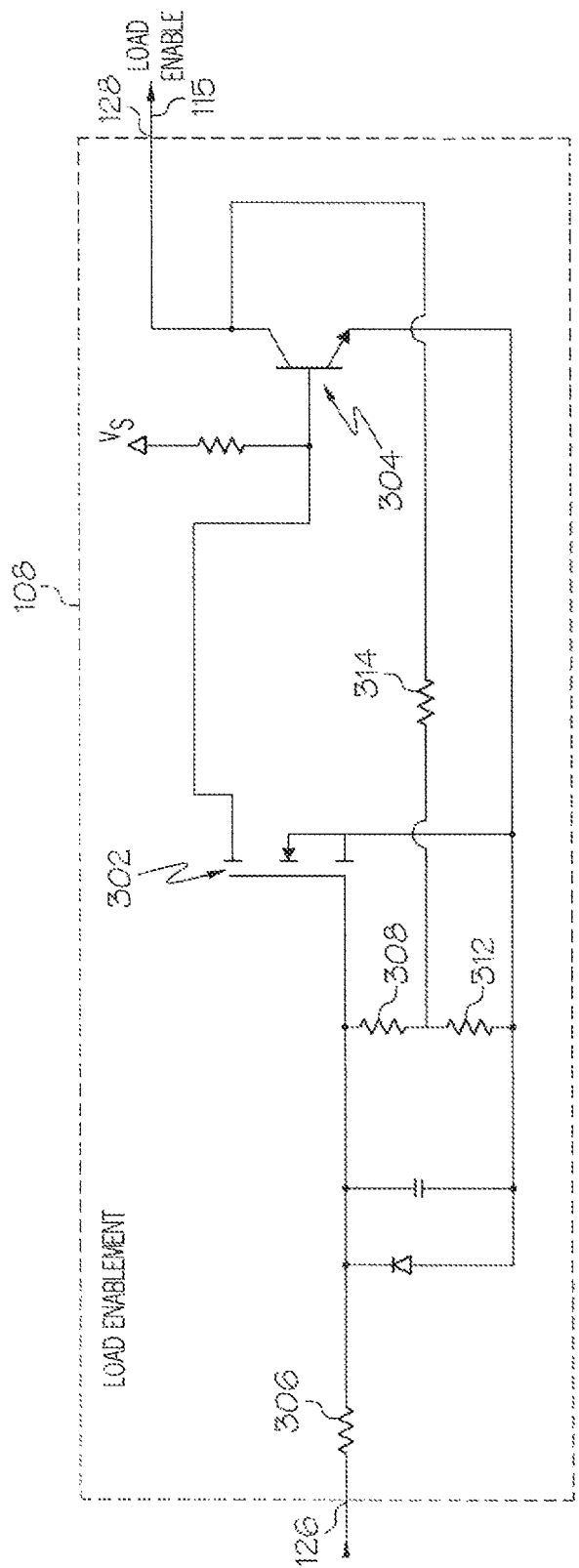
FIG. 3 depicts a detailed schematic representation of an alternative embodiment of a portion of the inrush current suppression circuit of FIG. 1.

It was noted above that the load enable circuit 108 may be variously implemented. Indeed, one alternative to the implementation depicted in FIGS. 1 and 2 is depicted in FIG. 3. This embodiment of the load enable circuit 108 is implemented without the comparator circuit 212. Instead, a FET 302, together with a bipolar transistor 304, is used to selectively supply the load enable signal 115 to the load 114. In particular, first and second resistors 306 and 308 form a voltage divider that uses the gate threshold of FET 302 as a level comparator. The bipolar transistor 304, together with third and fourth resistors 312 and 314, provide hysteresis for the load enable circuit 108. It is noted that third and fourth resistors 312, 314 are provided because resistors over several megohm do not offer repeatable circuit operation.

With the alternative embodiment depicted in FIG. 3, as current flow through the FET 116 increases, the increasing gate voltage magnitude on the gate terminal 116-G is being supplied to the gate terminal 302-G of FET 302. When the gate voltage magnitude is equal to or exceeds the gate threshold of FET 302, the FET 302 will conduct, which causes bipolar transistor 304 to turn off, and supply the load enable signal 115.

The circuit described herein, and the method that the circuit implements, limits the inrush current to a load for a sufficient period of time before full-enablement of the load. It does so without exhibiting undesirable component stack-ups, thereby alleviating concerns associated with unnecessary trips and component damage.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An inrush current suppression circuit, comprising:
   an input circuitry configured to receive an input voltage from a voltage source and configured, upon receipt thereof, to supply a gate voltage;
   an output circuitry configured to supply an output voltage;
   a current limiter circuit coupled between the input circuitry and the output circuitry, the current limiter circuit including a field effect transistor (FET) that comprises a gate terminal coupled to receive the gate voltage, the current limiter circuit configured, based on the gate voltage, to vary current flow from the output circuitry to the load;
   a load enable circuit coupled to the gate terminal, the load enable circuit configured to (i) sense the gate voltage and (ii) supply a load enable signal when the gate voltage is equal to or exceeds a predetermined voltage magnitude; and
   a load coupled to receive (i) the output voltage from the output circuitry and (ii) the load enable signal from the load enable circuit, the load configured such that it will not be fully energized until it receives the load enable signal.

2. The inrush current suppression circuit of claim 1, wherein:
   the load enable circuit comprises a comparator circuit having a first input terminal, a second input terminal, and an output terminal;
   the first input terminal is adapted for coupling to a reference voltage;
   the second input terminal is coupled to receive the gate voltage.

3. The inrush current suppression circuit of claim 1, wherein the comparator is configured to exhibit hysteresis.

4. The inrush current suppression circuit of claim 1, wherein the load enable circuit comprises:
   a second FET that comprises a gate terminal coupled receive gate voltage; and
   a transistor circuit coupled to the second FET.

5. The inrush current suppression circuit of claim 1, wherein:
   the FET further comprises a source terminal and a drain terminal;
   the current limiter circuit further comprises a resistance having a first terminal and a second terminal;
   the first terminal is connected to the source terminal; and
   the second terminal is connected to the drain terminal.

6. The inrush current suppression circuit of claim 1, wherein the FET comprises a metal-oxide semiconductor FET (MOSFET).

7. The inrush current suppression circuit of claim 1, wherein the input circuitry comprises a series resistor-capacitor (RC) circuit coupled to the gate terminal.

8. The inrush current suppression circuit of claim 1, wherein:
   the FET further comprises a source terminal and a drain terminal; and
   the current limiter circuit further comprises a non-linear resistance coupled between the source terminal and the drain terminal.

9. A method of controlling when a load may be fully energized, the method comprising the steps of:
   directing electrical current through a current limiting resistor, the current limiting resistor having a first terminal and a second terminal, the first terminal connected to a source terminal of a field effect transistor (FET), the second terminal connected to a drain terminal of the FET;
   varying a gate voltage magnitude on a gate terminal of the FET, whereby current flow through the FET is increased while current flow through the current limiting resistor is simultaneously decreased;

determining when the gate voltage magnitude on the gate terminal is equal to or exceeds a predetermined reference voltage magnitude; and enabling the load to be fully energized only when the gate voltage magnitude is equal to or exceeds the predetermined reference voltage magnitude.

10. The method of claim 9, wherein the step of determining when the gate voltage on the gate terminal is equal to or exceeds a predetermined reference voltage magnitude comprises:

using a comparator circuit to compare the gate voltage magnitude to the predetermined reference voltage magnitude to determine if the FET 116 is adequately enhanced.

11. The method of claim 9, wherein the step of determining when the gate voltage on the gate terminal is equal to or exceeds a predetermined reference voltage magnitude comprises:

supplying the gate voltage to a gate terminal of a second FET, the second FET having a gate threshold; and configuring the second FET to conduct when the gate voltage magnitude is equal to or exceeds the gate threshold of the second FET.

12. The method of claim 9, wherein the step of varying the gate voltage magnitude comprises:

connecting the gate terminal to a series connected resistor-capacitor (RC) circuit; and electrically energizing the FET and the series connected RC circuit.

13. The method of claim 9, further comprising using a body diode of the FET to rejecting line noise.

* * * * *